(12) United States Patent
Robic et al.

(10) Patent No.: US 9,003,914 B2
(45) Date of Patent: Apr. 14, 2015

(54) DEVICE FOR GENERATING RETURN FORCES FOR STICKS SUCH AS AIRCRAFT CONTROL STICKS

(71) Applicant: Sagem Defense Securite, Paris (FR)

(72) Inventors: Bernard Robic, Paris (FR); Christian Gouard, Paris (FR); Herve Gorecki, Paris (FR)

(73) Assignee: Sagem Defense Securite, Paris (FR)

( * ) Notice: Subject to any disclaimer, the term of this patent is extended or adjusted under 35 U.S.C. 154(b) by 33 days.

(21) Appl. No.: 13/770,566

(22) Filed: Feb. 19, 2013

(65) Prior Publication Data
US 2013/0220065 A1   Aug. 29, 2013

(30) Foreign Application Priority Data

Feb. 23, 2012  (FR) ..................................... 12 51677

(51) Int. Cl.
| | |
|---|---|
| G05G 9/047 | (2006.01) |
| B64C 13/04 | (2006.01) |
| G05G 17/00 | (2006.01) |
| B64C 13/46 | (2006.01) |

(52) U.S. Cl.
CPC ................ G05G 17/00 (2013.01); B64C 13/04 (2013.01); B64C 13/46 (2013.01)

(58) Field of Classification Search
CPC ........... G05G 1/04; B64C 13/46; B64C 13/04
USPC ............... 74/469, 471 XY, 523; 244/223, 224
IPC ......................................................... G05G 1/04
See application file for complete search history.

(56) References Cited

U.S. PATENT DOCUMENTS

| | | | |
|---|---|---|---|
| 4,580,210 A |   | 4/1986 | Nordstrom |
| 5,497,847 A | * | 3/1996 | Ota et al. ....................... 180/333 |
| 5,900,710 A | * | 5/1999 | Gautier et al. ................ 318/675 |
| 7,490,530 B2 | * | 2/2009 | Ishikawa et al. ......... 74/471 XY |
| 7,669,805 B2 | * | 3/2010 | Hors et al. .................... 244/221 |
| 8,240,617 B2 | * | 8/2012 | Biest et al. .................... 244/223 |

FOREIGN PATENT DOCUMENTS

| | | |
|---|---|---|
| EP | 1773655 (B1) | 11/2007 |
| EP | 1977970 (A2) | 10/2008 |
| EP | 2078998 (A2) | 7/2009 |
| FR | 2872306 (A1) | 12/2005 |

* cited by examiner

Primary Examiner — Thomas R. Hannon
Assistant Examiner — Adam D Rogers
(74) Attorney, Agent, or Firm — Muncy, Geissler, Olds & Lowe, P.C.

(57) ABSTRACT

A device for generating a return force for a control stick that is movable from a neutral position along a travel path, includes a mechanical connection member connecting the stick to a resilient return member for returning the stick towards the neutral position. The mechanical connection member and the resilient return member produce, over a first portion of the travel path, a first strength of return force and, over a second portion of the travel path, a second strength of return force. A transmission part is mechanically connected to the stick so that any stick movement along the second portion corresponds to turning movement of the transmission part, and so that the return force to the stick is transmitted to the stick positioned in the second portion.

9 Claims, 7 Drawing Sheets

Fig.13 ered by electrical and/or hydraulic actuators, which are themselves controlled with the help of sensors for sensing movement of the stick. With such apparatuses, the stick is not mechanically connected to the control surfaces and the user does not feel any resistance from the stick enabling the user to estimate how much the control surfaces have moved and the forces to which they are being subjected. The further a control surface departs from the flow axis of the fluid through which the aircraft is moving, the greater the forces the fluid imparts onto the control surface, thereby tending to remind the pilot that the control surface is off-axis relative to the flow of fluid.

It is therefore desirable in particular on aircraft with electrically and/or hydraulically actuated control surfaces to create return forces on the control stick that are representative of the theoretical position of the control surfaces. Thus, document U.S. Pat. No. 4,580,210 A1 describes a device for generating a return force on an aircraft control stick. The return force is generated by electrical actuators. In the event of those actuators failing, the pilot is deprived of any return force and that can make piloting dangerous.

DEVICE FOR GENERATING RETURN FORCES FOR STICKS SUCH AS AIRCRAFT CONTROL STICKS

The invention relates to the field of devices for generating return forces for sticks such as aircraft control sticks.

BACKGROUND OF THE INVENTION

Conventional aircraft are known in which the control surfaces of the wing are controlled mechanically by moving a control stick that is mechanically connected to the control surfaces.

Aircraft are also known in which the control surfaces are controlled by electrical and/or hydraulic actuators, which are themselves controlled with the help of sensors for sensing movement of the stick. With such apparatuses, the stick is not mechanically connected to the control surfaces and the user does not feel any resistance from the stick enabling the user to estimate how much the control surfaces have moved and the forces to which they are being subjected. The further a control surface departs from the flow axis of the fluid through which the aircraft is moving, the greater the forces the fluid imparts onto the control surface, thereby tending to remind the pilot that the control surface is off-axis relative to the flow of fluid.

It is therefore desirable in particular on aircraft with electrically and/or hydraulically actuated control surfaces to create return forces on the control stick that are representative of the theoretical position of the control surfaces. Thus, document U.S. Pat. No. 4,580,210 A1 describes a device for generating a return force on an aircraft control stick. The return force is generated by electrical actuators. In the event of those actuators failing, the pilot is deprived of any return force and that can make piloting dangerous.

OBJECT OF THE INVENTION

The object of the present invention is to provide a device for generating a return force for a stick, which device enables return forces to be generated reliably in application of a relationship that is predefined.

SUMMARY OF THE INVENTION

To do this, the invention proposes a device for generating a return force for a control stick that is movable from a neutral position along a travel path. The device comprises mechanical connection means for connecting the stick to resilient return means for returning the stick towards the neutral position. The mechanical connection means and the resilient return means are arranged to produce, over a first portion of the travel path, a first strength of return force and, over a second portion of the travel path, a second strength of return force. The mechanical connection means include a transmission part adapted firstly to be mechanically connected to said stick in such a manner that any movement of said stick along the second portion of the travel path corresponds to turning movement of the transmission part, and secondly to transmit the return force to said stick at least when the stick is positioned in the second portion of the travel path.

By means of the invention, the return force urging the stick towards its neutral position differs depending on whether the stick is positioned in one portion of its travel path or in another. This makes it possible to adjust the return force as a function of the position of the stick. Furthermore, the transmission of return forces is mechanical, since it takes place via the mechanical connection means, the rotary transmission part, and via a mechanical connection between the stick and the resilient return means. This increases the reliability of the function of providing a resilient return force of strength that varies depending on the position of the stick, since only mechanical means are involved in generating this force.

In a preferred embodiment of the device of the invention, the resilient means include at least one resilient torsion bar, i.e. a bar that is designed to be twisted by pivoting a section of the bar relative to a reference section of the bar about the longitudinal axis of the bar. Thus, the return force F depends in part on a twisting stiffness specific to the torsion bar that is coupled in turning with the transmission part. With a torsion bar, the resilient stiffness is perfectly symmetrical independently of the direction in which it is twisted (thereby simplifying adjustment of the return force desired for each position of the stick). The torsion bar is preferably arranged to generate a resilient return force purely as a result of the torsion bar being twisted.

In a preferred embodiment, the device may include a number n of torsion bars for generating at least a number n of different slopes for force relationships.

The stiffness of the torsion bars limits vibration modes compared with systems using helical springs or traction/compression springs, and is therefore particularly advantageous for controlling an aircraft having a broad vibratory spectrum, such as a helicopter. Unlike systems that include helical springs, torsion bars enable respective linear force relationships to be generated without any drift in slope (where slope is the angular resilient stiffness defining the angular elasticity of the bar).

BRIEF DESCRIPTION OF THE DRAWINGS

Other characteristics and advantages of the invention appear from the following description given by way of non-limiting indication and with reference to the accompanying drawings, in which.

DETAILED DESCRIPTION OF THE INVENTION

The invention relates to a return force generator device 1 for a control stick 2 mounted on a support Sup in order to be movable along an angular travel path 3. The support Sup enables the device 1 to be fastened to its environment, e.g. an armrest of a seat for a pilot of an aircraft.

The device has resilient return means 4 connected to the stick 2 by mechanical connection means 5 via at least one transmission shaft 6.

In each of its embodiments, the device 1 of the invention serves to generate return forces F on the control stick 2 that are a function of the position of the stick along its travel path 3. The return force F is generated with the help of resilient return means 4 that are described below and as a function of mechanical coupling provided by mechanical connection means 5 connecting the stick to the resilient means 4.

The mechanical connection means 5 are adapted to cause any movement of the stick 2 along its travel path 3 to correspond to a rotation of the transmission shaft 6. As explained below, the strength of the resilient return force F depends on the angle of rotation ALPHA of the transmission shaft 6, which itself depends on the position of the stick 2. ALPHA designates an angle of rotation of the transmission shaft 6 about its axis X-X relative to a reference angular position Ref for the shaft 6 (e.g. see FIG. 1). This reference position Ref corresponds to a neutral angular position in which no force is applied to the stick 2.

The mechanical connection means 5 are arranged so that the torsion bar(s) is/are coupled either permanently or selectively as a function of the angle of rotation of the transmission shaft 6.

The connection means 5 and the resilient means 4 are also arranged to generate a return force F that presents:
  a first strength I1 over a first portion 3a of the travel path 3 of the stick 2; and
  a second strength I2 over a second portion 3b of the travel path 3.

The first strength I1 is variable in application of the formula I1=K1*ALPHA and the second strength I2 is variable in application of the formula I2=K2*ALPHA, where K1 and K2 respectively define constant resilient stiffnesses that are different from each other. The return force F thus varies in application of two distinct relationships that are active respectively in the first and second portions 3a and 3b of the travel path 3 as a function of the angle of rotation ALPHA of the transmission shaft 6.

The invention also proposes several alternative types of mechanical connection means 5 and several alternative types of resilient return means 4. Depending on the selected combination of resilient means 4 and mechanical connection means 5, the number and the types of resilient return relationships can be determined in simple manner.

Mechanical Connection Means

The transmission shaft 6 mounted to turn about an axis X-X forms a portion of the mechanical connection means.

a) The Connection Between the Stick 2 and the Transmission Shaft 6

This connection may have various forms and does not itself form part of the invention. The transmission shaft 6 and the stick 2 may thus be mechanically connected together:
  either by securing the stick 2 to the shaft 6 so that the transmission shaft 6 and the stick 2 are both mounted to turn about the same axis X-X (solution not shown in the figures);
  or else, via a force transfer system 8 as shown in FIG. 1 or 12a, 12b, 12c, 12d when the stick 2 is mounted to turn about an axis Y-Y that is different from the axis X-X.

Figure 1:
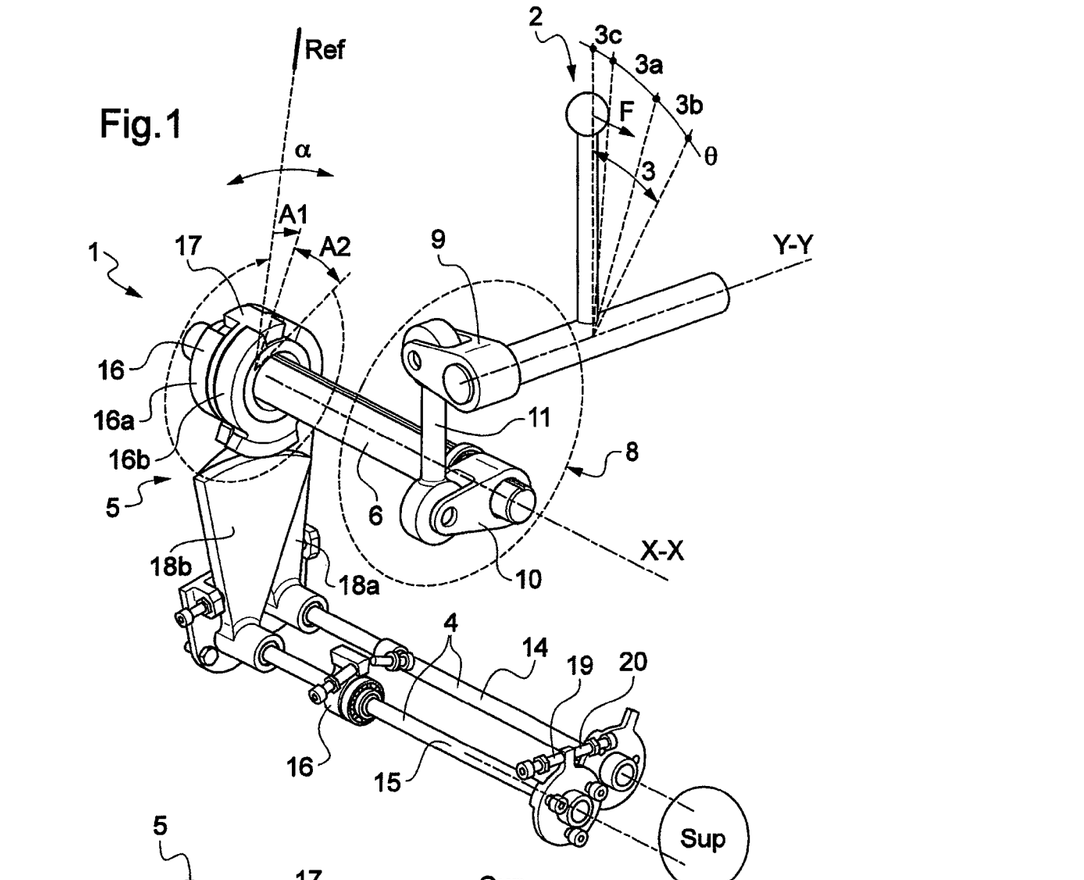
FIG. 1 is a fragmentary perspective view of a control system including the return force generator device in a first embodiment of the invention.

In a first embodiment of the force transfer system 8 shown in FIG. 1, the axis Y-Y is perpendicular to the axis X-X and the stick 2 is secured to a crank 9 extending perpendicularly to the axis Y-Y. The transmission shaft 6 carries a crank 10 extending perpendicularly to the axis X-X. A connecting rod 11 is hinged at its respective ends of the respective ends of the cranks 9 and 10.

In a second embodiment of the force transfer system 8 (see FIGS. 12a, 12b, 12c, and 12d), a bevel gear 12 of axis Y-Y is secured to the stick 2 to mesh with a bevel gear 13 of axis X-X and secured to the transmission shaft 6 so that the gears 12 and 13 form an angle transmission.

b) Connection Between the Transmission Shaft and the Resilient Return Means.

As explained below, the resilient return means 4 include at least one torsion bar 14, 15. Each of the torsion bars 14, 15 is connected to the transmission shaft 6 by coupling means 16 forming part of the mechanical connection means 5. These coupling means 16 include a selector part 17 constrained in rotation with the transmission shaft 6 and serving to provide selective coupling for the torsion bars 14, 15 with the transmission shaft 6 as a function of the angular position of the transmission shaft 6.

Figure 6:
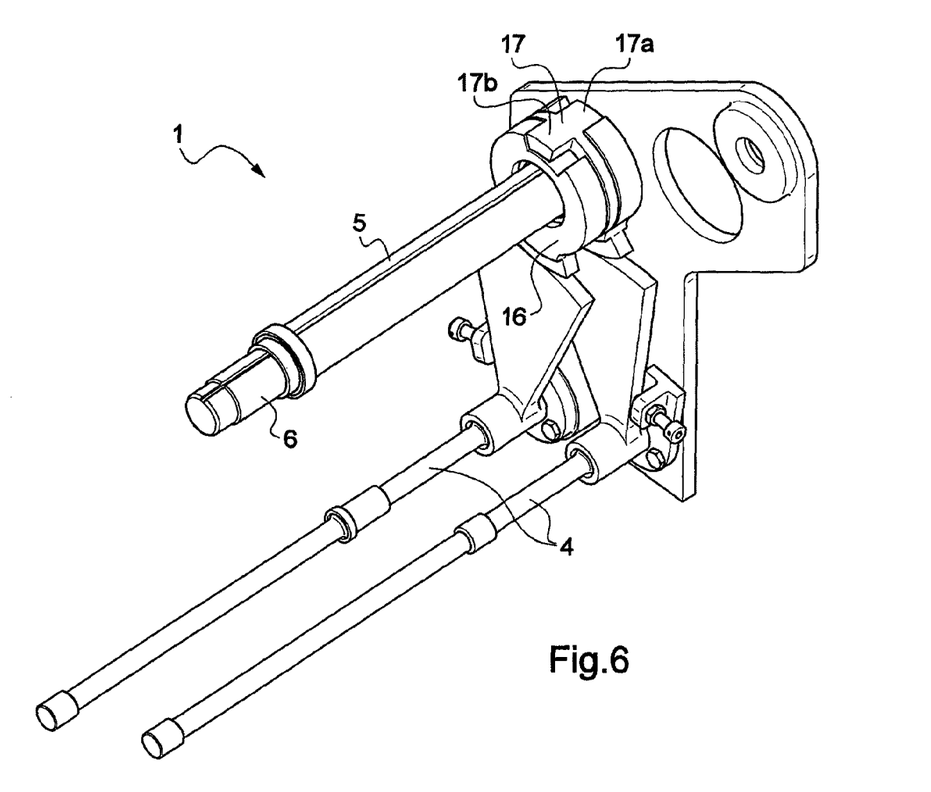
FIG. 6 is a perspective view showing a portion of the device of the invention as shown in FIG. 1.
Figure 7:
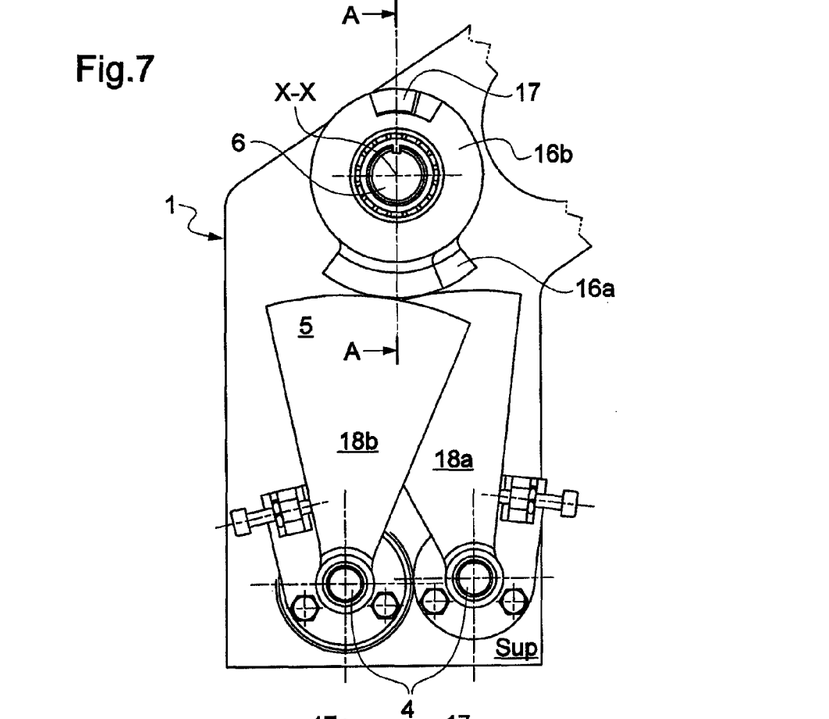
FIG. 7 is a side view of the device as shown in FIGS. 1 and 6, in a plane perpendicular to the axis of rotation of the transmission part.
Figure 8:
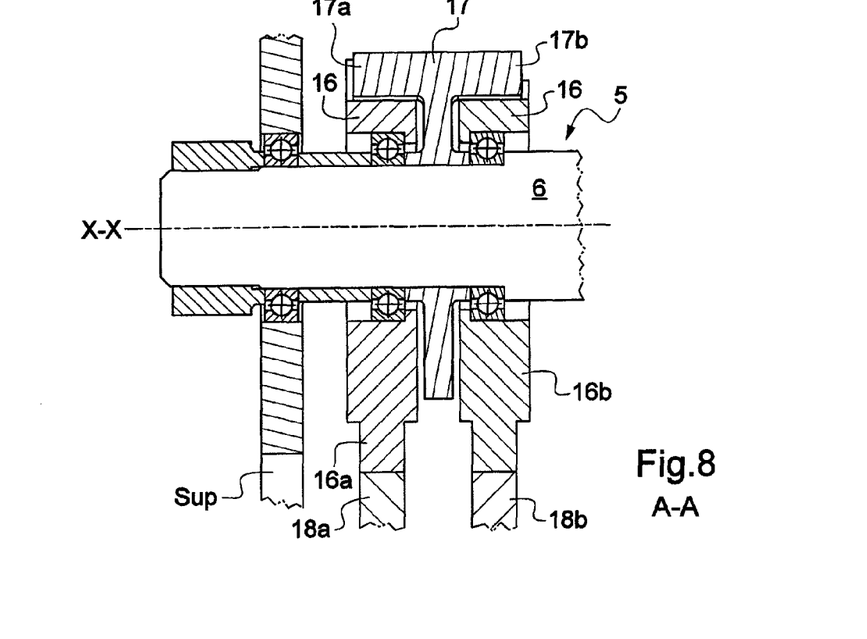
FIG. 8 is a fragmentary longitudinal section view on B-B showing the rotary transmission part of the device of the invention as shown in FIGS. 1 and 6.

In the embodiment of FIG. 1, shown in greater detail in FIGS. 6, 7, and 8, the selector part 17 is formed by a plate projecting radially from the transmission shaft 6. The part 17 carries angle abutments 17a and 17b that extend on either side of the part 17, projecting parallel to the axis X-X. The coupling means 16 also include first and second rings 16a and 16b that are mounted to pivot about the transmission shaft 6 on either side of the plate 17, each having an external notch receiving the respective angle abutments 17a, 17b with lateral clearance. Thus, each angle abutment of the part 17 limits the capacity of one of the rings 16a, 16b to turn relative to the transmission shaft. The notches in the rings 16a and 16b are offset from each other in such a manner that turning the transmission shaft 6 entrains:
  both rings 16a and 16b over a common angular portion of rotation;
  only the ring 16a over another angular portion; and finally
  only the ring 16b over a last angular portion.

Each of the torsion bars 14 and 15 is secured to a corresponding drive part 18a, 18b that is connected by toothed sectors respectively to the first ring 16a and to the second ring 16b so that any turning of the ring 16a or 16b corresponds respectively to turning of the drive part 18a or 18b.

Thus, as shown in FIG. 1, the angle abutments 17a and 17b of the selector part 17 are such that:
  only the torsion bar 14 is coupled to turn with the transmission shaft 6 during turning of the transmission shaft 6 along the first angular sector A1 corresponding to movement of the stick 2 along the first sector 3a of the travel path 3; and both torsion bars 14 and 15 are coupled in turning with the transmission shaft 6 during turning of the transmission shaft 6 over a second angular sector A2 corresponding to movement of the stick 2 along the second sector 3b of the travel path 3.

Thus, over the angular sector A1, the stiffness is that of the bar 14 alone, i.e. K1, and over the angular sector A2, the stiffness K2 is a combination of the restricted stiffnesses of the bars 14 and 15. It should be observed that these first and second sectors A1 and A2 are different from each other, i.e. they do not completely overlie each other.

The Resilient Return Means

Figure 11:
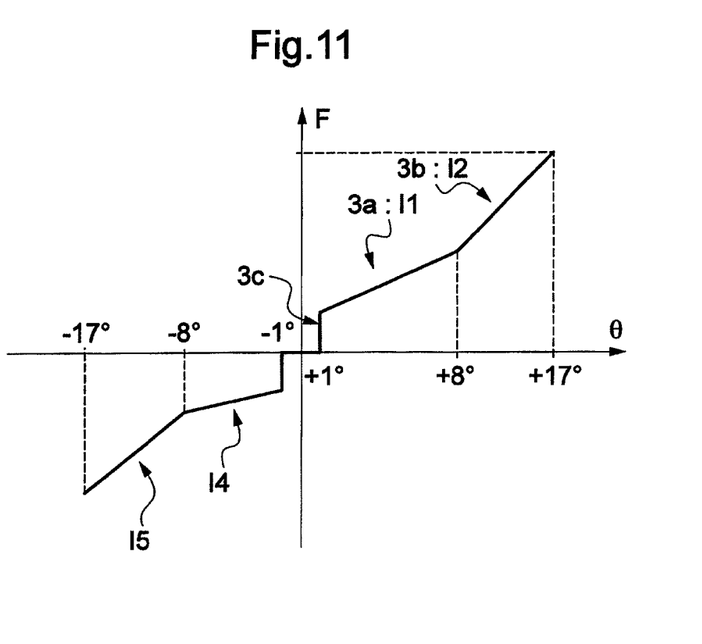
FIG. 11 is a graph showing how the return force F varies as a function of the angular travel θ of the stick over the range −20° to +20°.

As mentioned above, the resilient return means 4 comprise at least one torsion bar 14 and preferably two torsion bars 14 and 15 for generating a return force F of strength I1, I2, I4, I5 that varies as a function of the position of the stick along its travel path 3 (these variations are shown in FIG. 11).

Each bar 14, 15 is connected firstly to the transmission shaft 6 at least via the coupling means 16 and is also connected to the support Sup.

The torsion bars 14 and 15 may be connected to the support Sup as follows:

either by a fixed connection, as applies to the bar 14 in FIGS. 2, 9, 10, and 13 so that the end of the torsion bar remains stationary relative to the end carrying the drive parts 18a;

or else by a pivoting connection presenting radial abutments that limit the capacity of the bar to turn relative to the support Sup, as applies to the torsion bar 15 in FIGS. 1, 2, 3, 4, 5, and 13.

Figure 2:
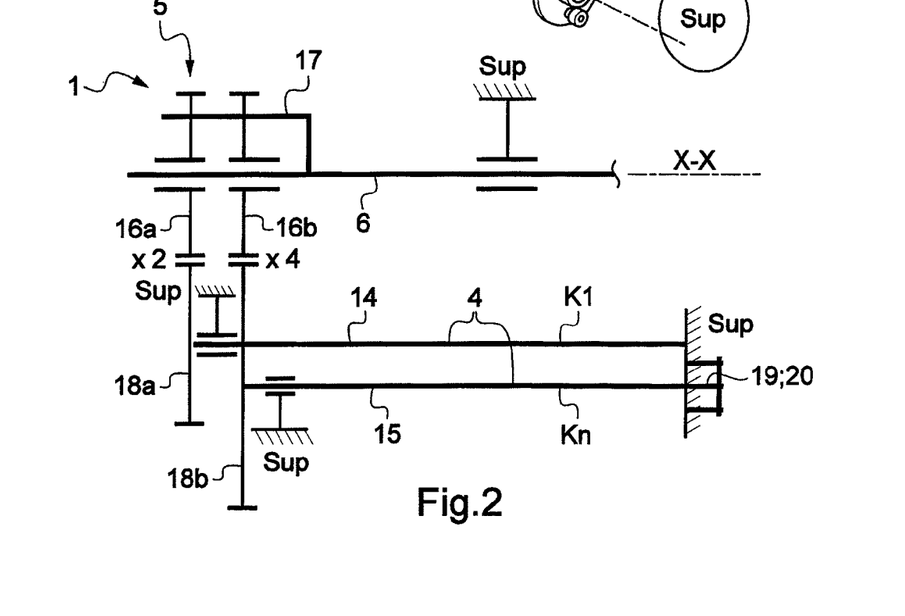
FIG. 2 is a kinematic diagram of the device of the invention as shown in FIG. 1, without its control stick.
Figure 3:
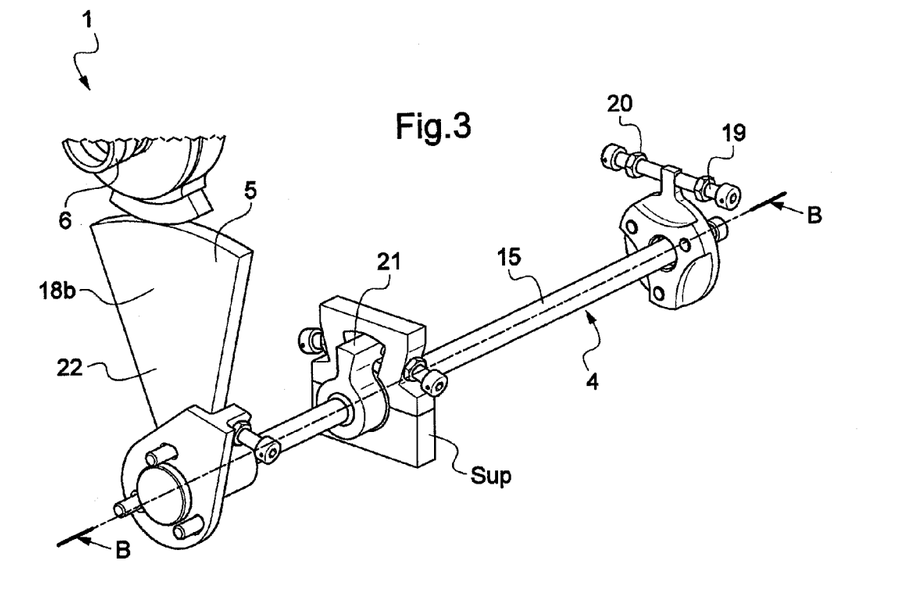
FIG. 3 is a perspective view of one of the torsion bars used in the return force generator device of FIGS. 1 and 2.
Figure 13:
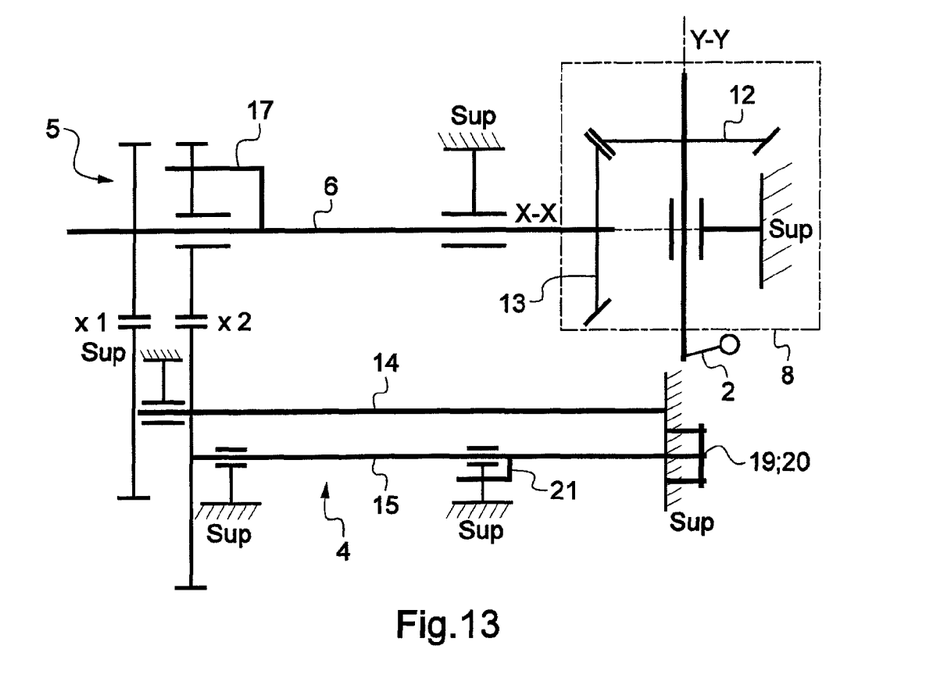
FIG. 13 is a diagrammatic view of a system of the invention including a return force generator device and means for connecting the stick to the force generator device that constitute an alternative to the means shown in FIG. 1.

FIGS. 1, 2, 3, 4, and 13 in particular show examples of pivoting connections between the torsion bar 15 and the support Sup, together with abutments 19 and 20. The angle abutments 19 and 20 are screws arranged on either side of a lug formed on the turning end of the torsion bar 15. The abutment positions of the lug are determined by adjusting the positions of the ends of the screws 19 and 20, thereby determining the amplitude of turning authorized for the torsion bar 15 relative to the support Sup. As shown in FIGS. 2 and 13, one of the torsion bars, the torsion bar 14 in this example, may have one end in fixed connection with the support Sup while another torsion bar, while in this example the torsion bar 15 has one end mounted free to pivot relative to the support Sup within the pivot angle limits determined by the abutments 19 and 20.

In a particular embodiment, at least one of the torsion bars, in this example the torsion bar 15, may be associated with angle abutments 21 to limit the twisting length of each bar as a function of its twist angle. Thus, as shown in FIGS. 1, 3, 4, 5, and 13, the angle abutments 21 are arranged so as:

to allow the torsion bar to twist over its entire length L within a maximum twist limit defined by the angle abutments 21; and beyond this maximum twist limit for the torsion bar, to allow twisting of the bar to be increased over only a fraction L1 of its length L, any increase in twisting being prevented over the remainder L2 of its length. The use of such angle abutments 21 determines how the stiffness of the torsion bar 15 varies as a function of its twist angle. A single bar can thus serve to generate two stiffnesses such as K1 and K2.

Figure 4:
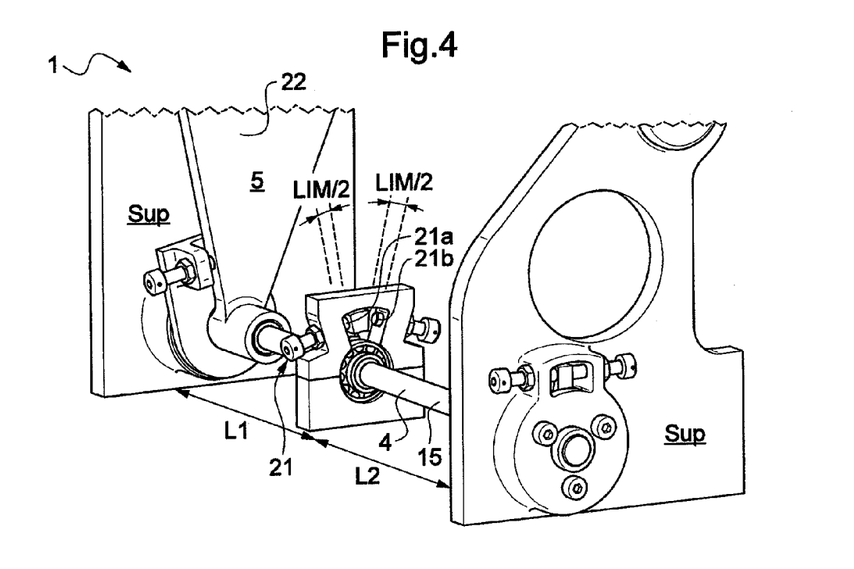
FIG. 4 is another perspective view of the FIG. 3 torsion bar assembled with a support.
Figure 5:
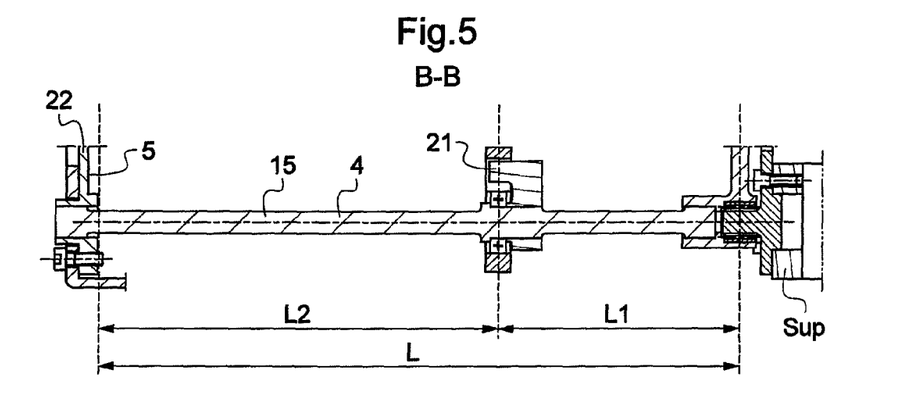
FIG. 5 is a section view on A-A of the torsion bar and of the angle abutment system shown in FIG. 4.

As can be seen in the detail views of FIGS. 4 and 5, the abutments 21a and 21b co-operate with an abutment secured to the torsion bar 15 and they are mounted on the support Sup at a distance L1 from the connection between the bar 15 and the support Sup, and at a distance L2 from rotary coupling means 22 of the torsion bar. The stiffness K1 may correspond to the twisting stiffness over the entire length L of the torsion bar. While the twist angle of the bar is less than an angular sector LIM/2 defined by each abutment 21a, 21b to extend on a respective side of a reference position Ref (i.e. a maximum twist amplitude LIM, see FIG. 4), the torsion bar 15 is twisted over its entire length L and its stiffness is K1. The stiffness K2 may correspond to the twisting stiffness of the fraction of the torsion bar that is of length L2, while the fraction of the torsion bar that is of length L1 is prevented from turning by the abutment system 21. On going past the predetermined maximum twist limit LIM/2, the abutments 21 prevent any increase in the twisting of the first fraction of the torsion bar of length L1 while allowing twisting to increase solely in the second fraction of length L2.

Various Kinds of Torsion Bar

It should be observed that various kinds of torsion bar exist that are all suitable for use in a device of the invention. In a single device for generating a return force, it is possible to use bars 14 and 15 of a single kind, or alternatively to combine torsion bars of different kinds.

Thus, the torsion bars 14 and 15 shown in FIGS. 1 to 8 are solid bars and they constitute a first kind of torsion bar.

Figure 9:
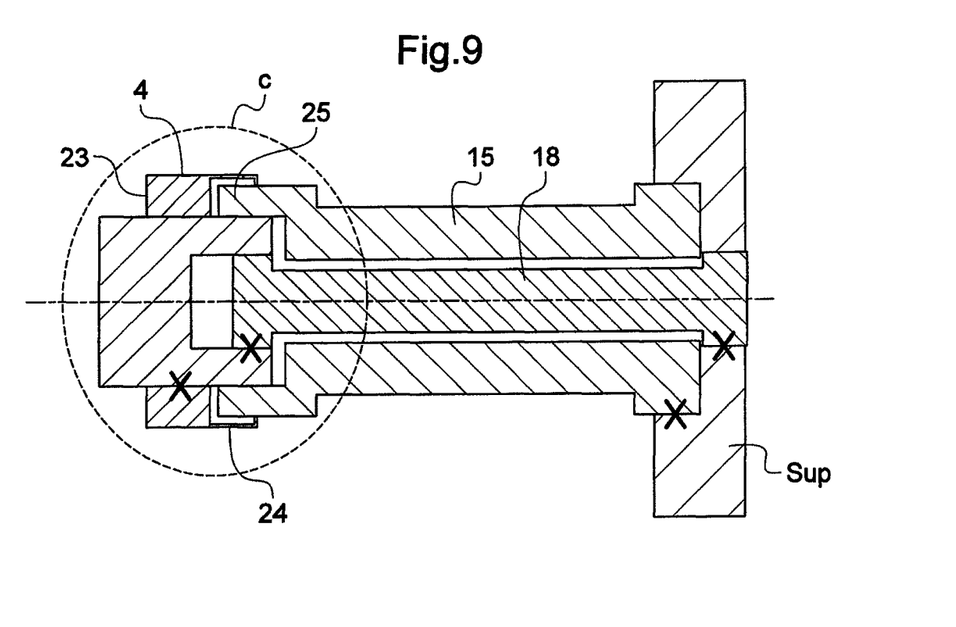
FIG. 9 is a longitudinal section view of a first type of resilient return means suitable for use in combination with any of the embodiments of the device of the invention.
Figure 10:
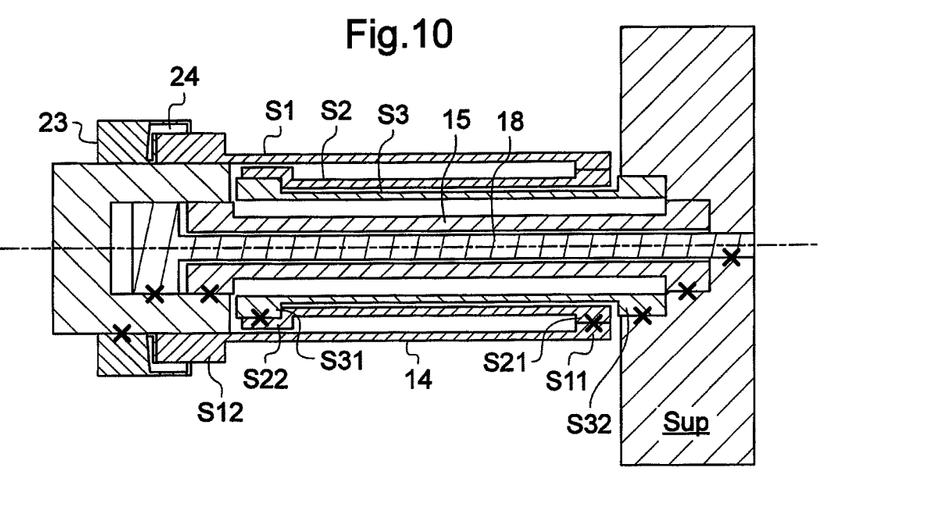
FIG. 10 is a longitudinal section view of a second type of resilient return means suitable for use in combination with any of the embodiments of the device of the invention.

The bar 15 shown in FIGS. 9 and 10 is a hollow tubular bar and it constitutes a second kind of torsion bar.

A third kind of torsion bar is shown in FIG. 10. This torsion bar 14 is constituted by at least three resilient tubular sections S1, S2, and S3 that are arranged coaxially and that are connected in series, i.e. the first and third sections S1 and S3 are connected together via the second section S2. The first of these sections S1 possesses an end S11 that is fixedly connected to a first end S21 of the second of these sections S2 so that twisting of the bar 14 necessarily takes place at least between a first end S12 of the first section S1 and a second end S22 of the second section S2. The second section S2 is fixedly connected to a first end S31 of the third of these sections S3. Finally, the connections of the second section S2 with the first and third sections S1 and S3 are designed to be spaced apart from each other. This assembly causes the twisting of the bar 14 to take place always between the second end S12 of the first section S1 and the second end S32 of the third section S3.

With such a torsion bar, stiffness is reduced by increasing the length of the sections S1, S2, and S3. This assembly also makes it possible to ensure that the torsion bar has large capacity for deformation without it being necessary to increase its length. The total stiffness K of such a bar is given by the formula:

$$1/K = 1/K' + 1/K'' + 1/K'''$$

where K', K'', and K''' are the respective stiffnesses of the resilient sections S1, S2, and S3. In addition, the capacity of such a torsion bar 14 for angular deformation is equal to the sum of the capacities for angular deformation of each of the resilient sections S1, S2, and S3.

Torsion bars of this third kind need have only two resilient tubular sections S1 and S2, or they could have more than three sections arranged coaxially.

Figure 9C:
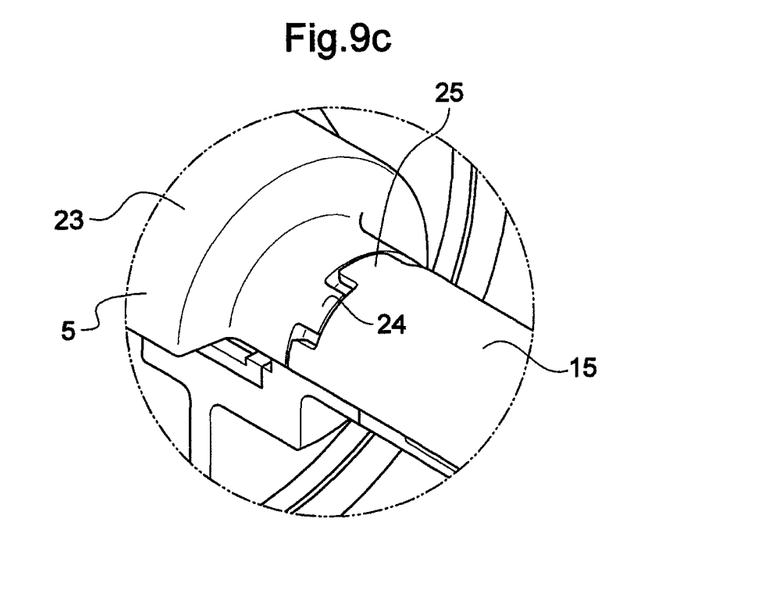
FIG. 9c is a (partially cutaway) perspective view showing a portion of the resilient means shown diagrammatically in FIG. 9.

In the example shown in FIGS. 9, 9c, and 10, the torsion bar 15 is in the form of a tube in which a torsion bar 18 is placed. This embodiment enhances compactness of the device 1. This is particularly advantageous when the device is incorporated in an armrest of a seat that presents limited inside volume.

The torsion bar assembly made up of at least one tubular torsion bar 15 and at least one other torsion bar 18 extending inside the tubular torsion bar 15 is provided in this example with a function whereby the torsion bars are coupled together selectively (with coupling between the torsion bars being selected as a function of the twist angle of the assembly, see more particularly FIG. 10). Thus, each torsion bar assembly with selective coupling is made up of two torsion bars 15 and 18 each having:

respective first ends that are fastened together so that they always pivot together; and respective second ends that are independent in pivoting relative to each other over a first angular sector in twisting of one of the torsion bars and that are constrained to turn together over a second angular sector.

This makes it possible to have two torsion relationships that follow each other during turning of one of these bars beyond the coupling angle.

In the FIG. 10 embodiment, a bar redundancy function is provided with the third torsion bar 18 being placed coaxially relative to the first and second torsion bars 14 and 15. This third torsion bar 18 is solid and lies inside the tubular torsion bars 14 and 15. The ends of the torsion bar 18 are fixedly assembled with the ends of the second bar 15 (the crosses between the bars 14, 15, and 18 and between those bars and the support Sup represent fixed connections).

Since the coaxial torsion bars 15 and 18 have their respective ends secured together, in the event of one of these torsion bars breaking, a degraded resilient return function continues to be provided.

In preferred embodiments, such as that shown in FIG. 1, it is ensured that the mechanical connection means connecting the resilient return means to the transmission shaft 6 are arranged so that the resilient means are decoupled from the stick 2 over a third portion 3c of the travel path of the stick 2 that is distinct from the first and second portions 3a and 3b.

Thus, over this third travel portion 3c, referred to as the disconnected portion, the torsion bars do not exert any resilient return force on the stick. The stick can be moved all along this travel portion 3c without stressing the resilient means, and the user does not feel any opposition to movement of the stick 2.

This disconnection travel portion 3c may be obtained by varying the widths of the notches in the rings 16a and 16b. This disconnection travel portion may also be obtained by allowing at least one of the torsion bars to turn relative to the support Sup through a disconnection angle that is predetermined by the radial abutments 19 and 20.

It is also possible to make this disconnection travel portion 3c by coupling the stick 2 to the transmission shaft 6 via a selective rotary coupling element 23 (FIG. 9c). The selected coupling element 23 is constrained to rotate with the transmission shaft 6. Over a given decoupling angular sector of the shaft 6, the coupling element 23 is turned while being decoupled in turning relative to one end of the torsion bar 18 on which the element 23 is assembled. The coupling element 23 is such that when it is outside the decoupling angular sector, it provides coupling in turning between the transmission shaft 6 and the torsion bar 15 so as to generate a resilient return force on the stick. The coupling element 23 in this example is a part that is mounted to turn about the twist axis of the torsion bar 15 and that includes teeth 24 complementary to teeth 25 of the torsion bar 15. These teeth 24 and 25 of the torsion bar 15 and of the coupling element 23 are spaced apart from one another over a predetermined angular sector for turning of the element 23 relative to the torsion bar 15 and they are in contact over another predetermined angular sector, thereby selectively constraining the element 23 in turning with the meshed end of the torsion bar 15 in selective manner.

FIG. 11 shows the return force F generated on the stick 2 as a function of the angle θ through which the stick has turned, the angle being expressed in degrees.

It can be seen that over the disconnection portion 3c, the stick can be pivoted about the reference position 0° without any return force F being generated, e.g. over a range −1° to +1°. In the embodiment of FIG. 1, this disconnection portion is obtained by adjusting the abutments 19 and 20 and also by the shapes of the notches formed in the rings 16a and 16b and the shapes of the lugs 17a and 17b penetrating respectively into the notches.

As soon as the stick 2 is being moved over its first travel portion 3a that extends in the range +1° to +8°, a resilient return force is exerted on the stick, since the transmission shaft 6 has pivoted through an angle that is sufficient to cause one of the torsion bars to pivot. Specifically, the torsion bar 15 pivots from +1° until it comes into angular abutment against one of the abutments 19 and 20. Over this range +1° to +8°, the resilient force is the result of twisting only one of the torsion bars, since the transmission shaft 6 comes into abutment against only one of the notches in the rings 16a and 16b. On going past the 8° pivot angle of the stick 2, the stick 2 enters into its second travel portion 3b and the resilient return force then takes the form of a linear function of stiffness that is greater than that observed over the first portion 3a. As a function of the adjustment selected for the device, this increase in stiffness over the second travel portion 3b happens because:

the transmission shaft 6 drives both of the rings 16a and 16b in pivoting; and/or the torsion bar 15 comes into abutment via the abutment system 21 against the abutments 19 and 20 that are fastened to the support Sup, thereby limiting the twisting length of the torsion bar to the length L2.

Substantially symmetrical operation is provided when the stick is turned through an angle of −1° to about −8°, and it can be seen that the strength 14 of the force F increases in absolute value in application of a linear function of constant slope until it reaches a return value of about −13 newtons (N). As soon as the stick is turned through an angle lying in the range −8° to −17°, it can be seen that the absolute value of the strength 15 of the force increases with increasing absolute value of the angle in application of a linear relationship of constant slope. This constant slope has an absolute value that is greater than that of the portion generating the force of strength I4.

As explained above with reference to FIGS. 9 and 10, it is also possible to vary the stiffness of the resilient means along the travel path of the stick 2 by making use of an assembly of two torsion bars that are coupled together selectively as a function of the twisting angle of one of the torsion bars in the assembly. For this purpose, the mechanical connection means 5 include a selective coupling part 23 for selectively connecting together two ends of coaxial torsion bars 14 and 15.

One end of the torsion bar 15 is fixedly connected to the part 23 so that it always pivots together therewith. This part 23 presents radial abutments or teeth 24 that are complementary to radial abutments or teeth 25 formed at one end of the torsion bar 14. This end of the torsion bar 14 is free to pivot relative to the part 23 so long as the abutments of the torsion bar 14 are not in contact against the abutments 24 of the part 23. Given that each of the torsion bars 14 and 15 has an end that is fixedly connected to the support Sup and given that the other ends of these bars are selectively connected to each other by the part 23, it can be seen that the stiffness of the assembly varies initially with a first slope and subsequently with a second slope.

The invention is not limited to the above-described examples and may include other embodiments that are not described and that come within the ambit of the invention as defined by the claims.

In particular, the invention also includes devices having at least one resilient means of the first type and at least one resilient means of the second type that are coupled simultaneously to the transmission shaft 6.

During turning of the transmission shaft 6, advantage is taken of the resilient return forces generated by the resilient means of the first and second types, each having two relationships for variation in force strength. It is thus possible to adjust the various rules for varying resilient return force strengths so as to obtain an overall variation rule that reproduces return forces of the types to which the user is used. The invention is particularly advantageous since it makes it possible to produce complex rules for generating return force without requiring an electronic device and solely with the help of mechanical means.

It should be observed that the invention makes it possible to have a return force generator device with n torsion bars, each having its own stiffness Kn as a function of the angle of rotation ALPHA. By using n such torsion bars, the device can make it possible to obtain at least n return force strengths In, where each $n^{th}$ strength In of the return force (F) varies in application of the formula In=Kn*ALPHA.

It should also be observed that in certain circumstances that are not shown, the force transfer system 8 connecting the stick to the transmission shaft 6 may have any form capable of linking turning movements of the stick about one or more axes of rotation with turning movements of the transmission shaft. Under all circumstances, the force transfer system 8 has the function of linking one or more turning movements of the stick 2 with a turning movement of the transmission shaft 6 of the mechanical connection means 5.

Figure 12A:
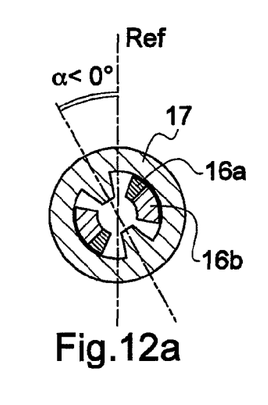
FIGS. 12a, 12b, 12c, and 12d show various angular positions of a selector constrained to rotate with the transmission shaft, the selector part being selectively engaged with one and/or the other of the resilient return means as a function of the angular position.
Figure 12B:
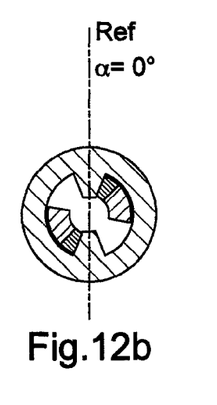
Figure 12C:
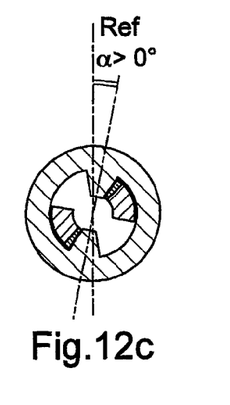
Figure 12D:
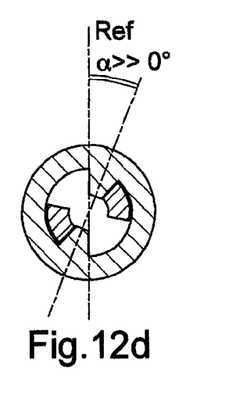

In the context of the invention, it should also be understood that the mechanical connection means 5 may comprise one or more angle selector parts 17 for selectively coupling one or more torsion bars of the resilient return means with the transmission shaft 6. As shown in FIGS. 12a, 12b, 12c, and 12d, a selector part 17 has angle abutments and serves to couple the transmission shaft 6 selectively with one or more torsion bars as a function of the angle through which the part 17 has turned. In FIGS. 12a, 12b, 12c, and 12d, the selector part 17 and the coupling means 16a and 16b are mounted to turn about the same axis. The coupling parts 16a and 16b are designed to be coupled respectively with the respective torsion bars so that turning the coupling part 16a through any angle corresponds to the torsion bar 14 turning through an angle, and turning the coupling part 16b through any angle corresponds to the bar 15 turning through an angle. In FIG. 12a, the angle ALPHA is less than 0° and the selector part 17 does not engage with the parts 16a and 16b, so there is no transmission of resilient force to the stick. In FIG. 12b, the angle ALPHA=0° and the selector part 17 engages solely with the part 16a, however the part 16a has not been pivoted beyond its neutral position, so there is still no transmission of resilient force to the stick. In FIG. 12c, the angle ALPHA is greater than 0° and the selector part 17 is engaged with the part 16a but not with the part 16b, so resilient force is transmitted to the stick solely via the part 16a. Only the resilient means constrained to turn with the part 16a generate the resilient return force. In FIG. 12d, the angle ALPHA is much greater than 0° and the selector part 17 is engaged with both of the parts 16a and 16b, so resilient force is transmitted to the stick via both of the parts 16a and 16b. The resilient means respectively constrained to pivot with the parts 16a and 16b generate the total resilient return force.

The ratio of the meshing sectors connecting the ring 16a and the drive part 18a may differ from the ratio of the meshing sector connecting the ring 16b with the drive part 18b, so that when the transmission shaft 6 is constrained to turn with the torsion bars 14 and 15, any turning of the shaft 6 gives rise to each of the torsion bars 14 and 15 turning through respective distinct angles.

Finally, the invention provides an aircraft such as a helicopter or an airplane fitted with a device of the invention and connected to a control stick, the stick itself being connected to sensors for sensing movements of the stick and associated with actuators for controlling the movements of moving wing surfaces of the aircraft. The invention is nevertheless applicable to any control stick.

The invention claimed is:

1. A device for generating a return force for a control stick that is movable from a neutral position along a travel path, the device comprising:
   mechanical connection means for connecting the stick to resilient return means for returning the stick towards the neutral position,
   wherein the mechanical connection means and the resilient return means are arranged to produce, over a first portion of the travel path, a first strength (I1) of a return force (F) and over a second portion of the travel path, a second strength (I2) of the return force (F), and in that the mechanical connection means include a transmission part adapted firstly to be mechanically connected to said stick in such a manner that any movement of said stick along the second portion of the travel path corresponds to turning movement of the transmission part, and secondly to transmit the return force (F) produced by the mechanical connection means and the resilient return means to said stick at least when the stick is positioned in the second portion of the travel path, and
   wherein said resilient return means comprises at least a first type of resilient return means, each resilient return means of the first type comprising a first torsion bar and a second torsion bar and means for providing rotary coupling between the first and second torsion bars and the transmission part, the means for providing rotary coupling being arranged;
      to couple said first torsion bar to the transmission part when said transmission part is pivoted relative to a predetermined reference position through an angle forming part of a first angular coupling sector;
      to couple said second torsion bar to the transmission part when said transmission part is pivoted, relative to the predetermined reference position through an angle forming part of a second angular coupling sector different from the first angular coupling sector; and
      to decouple said second torsion bar from the transmission art when said transmission part is pivoted relative to the predetermined reference position through an angle lying outside the second predetermined annular sector.

2. The device according to claim 1, wherein:
   the first strength I1 is variable in application of the formula I1=K1*ALPHA; and
   the second strength I2 is variable in application of the formula I2=K2*ALPHA, and
   wherein K1 and K2 respectively define constant and mutually different resilient stiffnesses and ALPHA (<) designates an angle through which the transmission part has turned relative to a reference angular position for said transmission part.

3. The device according to claim 1, wherein one of the first and second torsion bars of the resilient return means of the first type is in the form of a tube and the other of these torsion bars is placed inside said torsion bar which is in the form of a tube.

4. The device according to claim 1, wherein the first torsion bar of the resilient return means of the first type is constituted by a first resilient tubular section and a second resilient tubular section which are arranged coaxially, the first resilient tubular section having a first end fixedly connected to a first end of the second resilient tubular section so that the twisting of said first torsion bar takes place at least between a second end of the first torsion bar and a second end of the second resilient tubular section.

5. The device according to claim 4, wherein said first torsion bar includes at least one third resilient tubular section disposed coaxially relative to the first and second sections, the second resilient tubular section being fixedly connected to a first end of the third resilient tubular section, the respective connections of the second resilient tubular section with the first and third resilient tubular sections being spaced apart from each other so that the twisting of the first torsion bar takes place at least between the second end of the first torsion bar and a second end of the third resilient tubular section.

6. The device according to claim 1, wherein each resilient means of the first type includes a third torsion bar placed coaxially relative to the first and second torsion bars, and the third torsion bar has an end fixedly assembled with the ends of one of the first and second torsion bars.

7. The device according to claim 1, wherein said resilient return means include at least one second type of resilient return means, each resilient means of the second type including at least one torsion bar and means for providing rotary coupling between said at least one torsion bar and the transmission part, said at least one torsion bar of said resilient return means of the second type comprising a first longitudinal part and a second longitudinal par extending along a length of said at least one torsion bar, the means for providing rotary coupling between said at least one of the torsion bar and the transmission part being such that turning of the transmission part causes twisting of said at least one torsion bar of the resilient means of the second type; and said resilient means of the second type include an angle abutment system arranged in such a manner as to allow said at least one torsion bar of said resilient means of the second type to twist over said length (L) within a maximum twisting limit predetermined by the angle abutment system, and to prevent any increase in the twisting of the first longitudinal part while allowing the twisting of the second longitudinal part of said at least one torsion bar of said resilient means of the second type to increase when the maximum predetermined twisting limit is exceeded.

8. The device according to claim 7, wherein said first type of resilient return means and said second type of resilient return means are coupled simultaneously to the transmission part.

9. The device according to claim 1, wherein the mechanical connection means are adapted so that over a third portion of the travel path distinct from the first and second portions, the resilient return means are decoupled from the stick.

* * * * *